United States Patent [19]

Sato et al.

[11] Patent Number: 4,730,023

[45] Date of Patent: Mar. 8, 1988

[54] IMPACT RESISTANT METHACRYLIC RESIN COMPOSITION

[75] Inventors: Fumio Sato; Masamitsu Tateyama, both of Otake, Japan

[73] Assignee: Mitsubishi Rayon Company, Ltd., Tokyo, Japan

[21] Appl. No.: 913,213

[22] Filed: Sep. 29, 1986

[30] Foreign Application Priority Data

Nov. 29, 1985 [JP] Japan ................... 60-267407

[51] Int. Cl.$^4$ ............... C08L 39/04; C08L 51/06
[52] U.S. Cl. ........................... 525/73; 525/82; 525/83; 525/902
[58] Field of Search ............ 525/71, 73, 82, 85, 525/902

[56] References Cited

U.S. PATENT DOCUMENTS 3,661,994  5/1972  Hwa et al. .
3,793,402  2/1974  Owens .
3,808,180  4/1974  Owens .
4,387,138  6/1983  Gift .
4,443,103  2/1984  Kamata et al. .

FOREIGN PATENT DOCUMENTS 56-167712  12/1981  Japan .

Primary Examiner—Jacob Ziegler
Attorney, Agent, or Firm—Brumbaugh, Graves, Donohue & Raymond

[57] ABSTRACT

An impact resistant methacrylic resin composition having improved transparency, weatherability and impact resistance comprising a multi-layer graft copolymer and a methacrylic resin is disclosed. The multi-layer graft copolymer is prepared through 3 step polymerizations as follows: in the first step, a semi-soft copolymer is prepared by polymerizing specific amounts of an alkyl methacrylate having an alkyl group with 1 to 4 carbon atoms, styrene and/or its derivative, alkyl acrylate having an alkyl group with 1 to 8 carbon atoms and a specific polyfunctional monomer; in the second step, a soft copolymer containing alkyl acrylates having an alkyl group with 1 to 8 carbon atoms as the main unit is prepared so that the semi-soft copolymer is included in the inner layer of the soft copolymer; and in the third step, a methacrylic polymer or copolymer is prepared by polymerizing monomers main component of which is alkyl methacrylates having an alkyl group with 1 to 4 carbon atoms or a mixture thereof to form an outermost layer. The third step may be divided into two or more steps. The multi-layer methacrylic copolymer thus obtained is compounded with and dispersed in a methacrylic resin the unit of which is methyl methacrylate.

8 Claims, 2 Drawing Figures

IMPACT RESISTANT METHACRYLIC RESIN COMPOSITION

DESCRIPTION

1. Field of the Invention

The present invention relates to a methacrylic resin composition having improved transparency, weatherability and impact resistance.

2. Description of the Prior Art

Methacrylic resin is widely used for such various applications as parts of automobiles, dust covers, office automation instruments, and kitchen items such as containers for table seasoning. Methacrylic resin is also used, in the form of a cast sheet, for window glazing, and for extrusion molded articles or injection molded articles because of its excellent transparency and weatherability.

While methacrylic resin has the above-mentioned advantages, its relatively poor impact resistance has restricted its use in many applications.

Various proposals have been presented for many years to provide a methacrylic resin with improved impact resistance, but impact resistant methacrylic resins with the excellent transparency, appearance, weatherability and processability, which are inherent properties of methacrylic resin, have not yet been available.

The most widely used and effective methods for improving the impact resistance of methacrylic resin involves the dispersion of an elastomeric material in the resin. As the elastomeric material, unsaturated elastomers containing butadiene as the main unit, saturated elastomers such as acrylic copolymers and ethylene-vinyl acetate copolymers are used. Such acrylic copolymers comprise a crosslinked copolymer (elastomer) containing butyl acrylate or 2-ethylhexyl acrylate as the main unit and a methyl methacrylate polymer or copolymer (hard polymer) grafted to the crosslinked copolymer.

The blending of the unsaturated elastomer with a methacrylic resin provides an improvement in impact resistance, but the presence of unsaturated bonds in the butadiene causes poor weatherability. On the other hand, the blending of the saturated elastomer with the resin provides good weatherability, but results in insufficient impact resistance, transparency and gloss. In addition, flow marks are formed on the surface of molded articles made with conventional methacrylic resin materials which impair the surface appearance. In the preparation of an impact resistant resin composition comprising two components in which an elastomer is homogeneously dispersed as discontinuous phase in a continuous phase of a hard polymer resin such as methacrylic resin, the particle size of the elastomer, the degree of grafting of the hard polymer to the elastomer and the molecular weight of the hard polymer are regarded as predominant factors. In practice, the quality and balance in characteristics of the resultant resin composition are influenced greatly by these factors.

In general the smaller the particle size of the elastomer, the more transparent the resin composition becomes but the lower the impact resistance is. On the other hand, when the particle size is larger, the impact resistance will be higher but the gloss will decrease and flow mark tends to occur. Although such defects can be avoided by using a large amount of a crosslinking monomer, the impact resistance tends to decrease when increased amounts of crosslinking monomer are used.

Moreover the degree of grafting of the hard polymer to the elastomer greatly affects the compatibility and dispersibility of the elastomer into the continuous hard resin phase. Therefore such resin compositions require special considerations. Increasing the molecular weight of the hard polymer provides more effective improvement in the impact resistance but has a negative effect on the processability and surface appearance of the end or final resin product.

Recently, impact resistant methacrylic resin compositions with improved weatherability which contain an acrylic copolymer as an elastomer have been proposed. Some of these proposals and the difficulties with them will be described hereinafter.

In the first place, U.S. Pat. No. 3,808,180 describes a multi-layer copolymer having soft and hard polymer layers prepared by grafting a relatively hard polymer component comprising methyl methacrylate as the main unit onto a soft polymer containing alkyl acrylate as the main unit. This does provide an improvement in the impact resistance of a methacrylic resin composition, but if the particle size of the copolymer is relatively large, for example 0.2 to 0.4 μm, the transparency and gloss of the resin composition decrease and the appearance is deteriorated. Consequently the application of such polymers thereof is restricted. This problem is essentially the same for the compositions of U.S. Pat. No. 4,387,138, in which the characteristics are modified by dividing the soft polymer layer. When the particle size is relatively small, for example about 0.1 μm or less, in order to provide improved impact resistance, a relatively larger amount of elastomer must be used which causes a decrease in the modulus and the surface hardness of the final resin product.

In addition, U.S. Pat. Nos. 3,661,994, 3,793,402, 4,443,103, and Japanese Laid-Open Patent Application No. 56(1981)-167712 describe methods in which copolymers having three-layer, hard-soft-hard, structures are prepared by forming a soft polymer phase containing an alkyl acrylate as the main unit as a layer on an inner core of a hard polymer phase containing, for example, 70 to 100% by weight of methyl methacrylate or styrene then graft polymerizing a monomer containing 70 to 100% by weight methyl methacrylate or styrene to form an outer shell.

The most important feature of these methods is the graft polymerization of a monomer or monomer mixture which will form a hard polymer phase on a soft polymer phase having a core of a hard polymer phase as the innermost portion. In particular, a composition described in U.S. Pat. No. 3,793,402 has a hard polymer core which contains 70 to 100% by weight of a monomer unit for a hard polymer such as methyl methacrylate and styrene and a soft polymer phase containing alkyl acrylate units as the main constituent is formed as a layer on the core. A polyfunctional compound having a specific structure, such as allyl methacrylate, is used in the first hard and soft stages in order to improve the efficiency of grafting of a polymer phase on the preceding polymer phase, which is an important feature of these methods.

By these methods the impact resistance of a methacrylic resin composition can be improved while maintaining the modulus and surface hardness but, because the impact resistance depends only on the soft polymer phase which forms the outer shell of the core, the particle size of the copolymer must be kept relatively large at the stage prior to the second hard stage causing inferior appearance such as lower transparency and lower gloss. In addition the improvement in impact resistance is insufficient for many applications. It was believed that improvement could be provided by changing the graft linking monomer. As in the other methods using a copolymer having a three-layer hard-soft-hard structure, a monomer having double bonds with an equal reactivity, such as triallyl isocyanurate and 1,3-butylene dimethacrylate is used in a soft stage. Furthermore the formation of the second hard stage of the outermost layer is divided into two steps. In the first step a monomer such as 1,3-butylene dimethacrylate is copolymerized and in the second step such monomer is not used. This is disclosed in Japanese Laid-Open Patent Application No. 56(1981)-167712, while a method in which an allyl cinnamate and/or allyl sorbate is used in the soft stage is disclosed in U.S. Pat. No. 4,433,103. In these methods, however, a very narrow range of conditions is required to keep the proper balance of impact resistance and appearance characteristics such as transparency and gloss.

SUMMARY OF THE INVENTION

The purpose of the present invention is to provide a methacrylic resin composition with improved impact resistance without any deterioration of various characteristics which are inherent in methacrylic resin such as transparency, gloss, modulus and surface hardness.

The problems of the prior art methods described above can be solved by providing a resin composition including a multi-layer graft copolymer prepared by a process comprising three steps as follows:

a first step in which a semi-soft copolymer is prepared by polymerizing specific amounts of alkyl methacrylate having an alkyl group with 1 to 4 carbon atoms, styrene and/or a styrene derivative, alkyl acrylates having an alkyl group with 1 to 8 carbon atoms, and a specific polyfunctional monomer;

a second step in which a soft polymer phase containing alkyl acrylate units having an alkyl group with 1 to 8 carbon atoms as the main unit is formed so that the semi-soft copolymer comprises an inner layer of double-layer elastic copolymer (I); and a third step in which a multi-layer graft copolymer (II) is prepared by polymerizing in one or more stages one or more monomers the main component of which is alkyl methacrylate having an alkyl group with 1 to 4 carbon atoms.

The multi-layer methacrylic copolymer is then compounded with and dispersed in a methacrylic resin (III), the main unit of which is methyl methacrylate.

More particularly, the present invention provides a methacrylic resin composition comprising a multi-layer graft copolymer (II) and a methacrylic resin (III) which contains 1 to 70% by weight of a double-layer elastic polymer (I) therein.

The double-layer elastic polymer (I) is prepared by way of the first step and the second step described above, wherein in the first step 5 to 50 parts by weight of a monomer mixture (A) comprising 57 to 43% by weight of at least one alkyl methacrylate having an alkyl group with 1 to 4 carbon atoms, 7 to 12% by weight of styrene or its derivative, 35 to 45% by weight of at least one alkyl acrylate having an alkyl group with 1 to 8 carbon atoms, and 0.1 to 10% by weight of a polyfunctional monomer having two or more acryloyloxy groups and/or methacryloyloxy groups in one molecule thereof is polymerized, and in the second step 95 to 50 parts by weight of a monomer mixture (B) comprising 69 to 89% by weight of at least one alkyl acrylate having an alkyl group with 1 to 8 carbon atoms, 10 to 30% by weight of styrene or its derivative, 0.1 to 5% by weight of a graftlinking monomer and 0 to 5% by weight of a polyfunctional monomer having two or more acryloyloxy groups and/or methacryloyloxy groups in one molecule thereof is polymerized in the presence of the polymer obtained through said first step.

The multi-layer graft copolymer (II) is obtained by polymerization in three stages or more, wherein in these stages 30 to 900 parts by weight of a monomer mixture (C) comprising 80 to 100% by weight of at least one alkyl methacrylate having an alkyl group with 1 to 4 carbon atoms, 0 to 20% by weight of at least one alkyl acrylate having an alkyl group with 1 to 8 carbon atoms, 0 to 10% by weight of other vinyl or vinylidene monomer which is copolymerizable therewith, and 0 to 3% by weight of a polyfunctional monomer having two or more acryloyloxy groups and/or methacryloyloxy groups in one molecule thereof is added in one or more steps to 100 parts by weight of said double-layer elastic copolymer (I) and polymerized.

Finally, the methacrylic resin (III) comprises 80 to 100% by weight of methyl methacrylate units and 0 to 20% by weight of vinyl or vinylidene monomer units.

In addition, this invention provides a methacrylic resin composition comprising a multi-layer graft copolymer (II) and the above-mentioned methacrylic resin (III) which contains 1 to 70% by weight of above-mentioned double-layer elastic polymer (I) therein, in which the said multi-layer graft copolymer (II) is obtained through four polymerization steps. In the third of the four steps 1 to 100 parts by weight of a monomer mixture (C-1) comprising 80 to 99.9% by weight of at least one alkyl methacrylate having an alkyl group with 1 to 4 carbon atoms, 0 to 20% by weight of at least one alkyl acrylate having an alkyl group with 1 to 8 carbon atoms, 0 to 10% by weight of a vinyl or vinylidene monomer which is copolymerizable therewith, and 0.1 to 3% by weight of a polyfunctional monomer having two or more acryloyloxy groups and/or methacryloyloxy groups in one molecule thereof are polymerized in the presence of 100 parts by weight of the double-layer elastic copolymer (I). In the fourth step 10 to 899 parts by weight of a monomer mixture (C-2) comprising 100 to 80% by weight of at least one alkyl methacrylate having an alkyl group with 1 to 4 carbon atoms, 0 to 20% by weight of at least one alkyl acrylate having an alkyl group with 1 to 8 carbon atoms and 0 to 10% by weight of a vinyl or vinylidene monomer which is copolymerizable therewith is added and polymerized wherein the total amount of (C-1) and (C-2) ranges from 30 to 900 parts by weight and the weight ratio of both monomer mixtures (C-2)/(C-1) ranges from 0.5 to 50.

As mentioned previously, the most important feature of the present invention involves the polymerization of a monomer mixture of an acrylate and a specific amount of a polyfunctional monomer having a specific structure on the surface of a semi-soft cross-linked core which is a copolymer of a specific monomer mixture in the specific amounts.

DETAILED DESCRIPTION OF THE INVENTION

Figure 1:
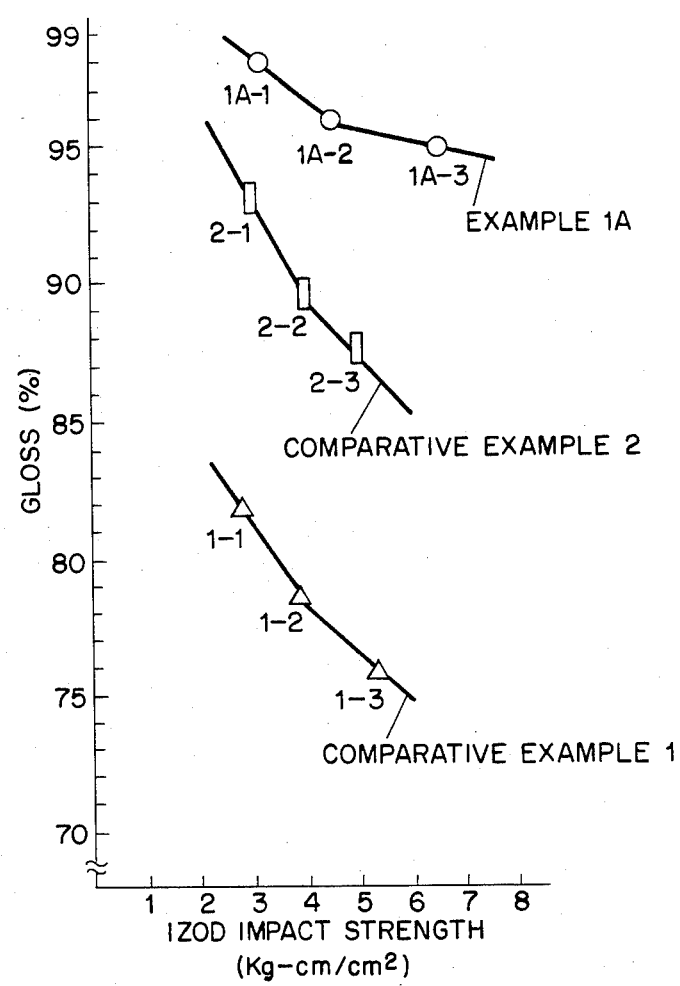
FIG. 1 is a graph which shows the relationship between the gloss and the Izod impact strength of various products made from a methacrylic resin composition.

In a multi-layer graft copolymer according to the present invention, the semi-soft crosslinked core produced by the first step has a glass transition temperature relatively close to room temperature and thus contributes to the impact resistance of the elastomeric copolymer layer produced in the second stage so as to produce a synergistic effect. Because this core is not soft but semi-soft, the appearance characteristics, such as transparency and gloss, of the resin composition are more significantly improved, as in the case in which a hard copolymer is used as the core, in comparison to the case in which a soft copolymer is used as the core.

Greatly improved transparency can be obtained when the four polymers, that is the semi-soft first step copolymer (I) obtained by polymerizing the monomer mixture (A) containing a polyfunctional monomer, the elastic second step copolymer (II) obtained by polymerizing the monomer mixture (B) containing a graftlinking monomer, the hard third step polymer obtained by polymerizing the monomer mixture (C), and the methacrylic resin (III) for blending therewith, have the same or nearly the same refractive indices.

In order to balance the transparency and surface appearance with the impact resistance of the resin composition obtained by dispersing elastomer particles in the continuous resin phase, attention must be paid to the particle size of the elastomer particles. In a resin composition of the present invention, the range of particle sizes when the acrylate monomer mixture (B) containing a graftlinking monomer polymerizes substantially to completion, is preferably 0.13 to 0.45 $\mu$m, more preferably 0.2 to 0.35 $\mu$m, in order to obtain a methacrylic resin composition which has excellent transparency and surface appearance and as well as high impact resistance.

In the present invention, the monomer mixture (A) containing a polyfunctional monomer used in the first step to form a semi-soft copolymer core comprises 57 to 43% by weight of at least one alkyl methacrylate having an alkyl group with 1 to 4 carbon atoms, 7 to 12% by weight of styrene or a styrene derivative, 35 to 45% by weight of at least one alkyl acrylate having an alkyl group with 1 to 8 carbon atoms, and 0.1 to 10% by weight of a polyfunctional monomer having two or more acryloyloxy groups and/or methacryloyloxy groups in one molecule thereof. Five to 50 parts by weight of the monomer mixture (A), more preferably 10 to 40 parts by weight, is used to 100 parts by weight of the total of the monomer mixture (A) and the monomer mixture (B) used in the second step polymerization. If the amount is less than 5 parts by weight, the improvement in impact resistance is not remarkable, and the transparency is reduced. On the other hand if the amount exceeds 50 parts by weight, the gloss and impact resistance tend to decrease.

In the first step polymerization, by incorporating 35 to 45% of alkyl acrylate which has a lower glass transition point into the polymer, it is found that the resultant polymer has properties intermediate between the elastomer and the hard polymer, that is, the characteristics of semi-soft resin, and that this polymer supports sufficiently the second stage elastomer layer which contributes to the improvement in impact resistance. If the amount of the alkyl acrylate unit in the first step is outside the range specified in accordance with the present invention, a resin composition having well balanced transparency and gloss and impact resistance cannot be obtained.

For example, if more of the alkyl acrylicate unit than specified in accordance with the present invention is used, the temperature dependence of the gloss and the transparency (haze) of the methacrylic resin composition increases. On the other hand if less of the alkyl acrylate unit and more of hard polymer component, such as methyl methacrylate, than specified in accordance with the present invention, is used, the improvement in impact resistance provided by the elastomer layer decreases.

Examples of the alkyl methacrylate having an alkyl group with 1 to 4 carbon atoms used in the monomer mixture (A) used in the first step include methyl methacrylate and ethyl methacrylate, but methyl methacrylate is most preferably used. Examples of styrene or its derivatives include styrene and styrene derivatives such as $\beta$-methyl styrene and p-methyl styrene. Among these styrene is most preferably used.

Examples of the alkyl acrylate having an alkyl group with 1 to 8 carbon atoms include methyl acrylate, butyl acrylate, and 2-ethylhexyl acrylate. Among these alkyl acrylates butyl acrylate and 2-ethylhexyl acrylate are most preferably used. Examples of the polyfunctional monomer having two or more acryloyloxy groups and/or methacryloyloxy groups in which at least two copolymerizable double bonds are contained in one molecule thereof include bifunctional monomers such as ethyleneglycol dimethacrylate, ethyleneglycol diacrylate, 1,3-butylene dimethacrylate, 1,4-butanediol diacrylate and 1,6-hexanediol diacrylate, trifunctional monomers such as trimethylolpropane triacrylate and tetrafunctional monomers such as pentaerythritol tetraacrylate. These polyfunctional monomers are used alone or in combination as the crosslinking monomer.

Among these polyfunctional monomers 1,6-hexanediol diacrylate and 1,4-butanediol diacrylate are preferably used.

The second step polymer which serves as the elastomer layer is a copolymer from a monomer mixture (B) comprising 69 to 89% by weight of at least one alkyl acrylate having an alkyl group with 1 to 8 carbon atoms (preferably n-butyl acrylate or 2-ethylhexyl acrylate), 10 to 30% by weight of styrene or its derivative, 0.1 to 5% by weight of a graftlinking monomer and 0 to 5% by weight of a polyfunctional monomer selected from the same group as described in respect of the first step polymer. The second step polymer is formed on the surface of the semi-soft crosslinked copolymer by polymerizing the monomer mixture (B) in the presence of the semi-soft copolymer of the first step. The ratio of alkyl acrylate monomer to styrene or its derivative in the second stage is one of the most important factors for providing transparency in the resin composition, and the transparency decreases if the chemical composition of the second step lies out of the range defined above.

The amount of graftlinking monomer used in the second step is one of the most important factors of the present invention. The amount of the graft linking monomer to be used depends on whether it is used alone or in combination, but an amount from 0.1 to 5% by weight is suitably used.

The graftlinking monomers used in the present invention include polyethylenically unsaturated monomers which are capable of addition polymerization and have double bonds at least one of which has a different reactivity from other double bond.

Examples of graftlinking monomers useful in the present invention include allyl, methallyl and crotyl esters of acrylic acid and methacrylic acid; allyl, methallyl and crotyl esters of maleic acid, fumaric acid and itaconic acid (either monoesters or diesters may be used); triallyl cyanurate and triallyl isocyanurate; and allyl sorbate, allyl cinnamate, diallyl isophthalate and triallyl trimeritate. These monomers may be used either alone or in combination.

Because the monomer mixture (B) containing a graftlinking monomer is polymerized in the presence of the core (innermost layer) of the semi-soft copolymer, it is essential that the relation of the graftlinking monomer to the semi-soft copolymer be considered in selecting the graftlinking monomer. From this viewpoint preferable examples of the graftlinking monomer include triallyl isocyanurate, triallyl cyanurate, allyl cinnamate, allyl methacrylate, triallyl cyanurate, allyl sorbate and diallyl isophthalate. In view of the relation between the semi-soft core of the innermost layer (the first step) and the hard polymer of the outer layer (the third step), trially isocyanurate and allyl cinnamate are most preferably used.

The same styrene or styrene derivative used in the first step may also be used as the styrene or styrene derivative in the second step. Examples of the polyfunctional monomer which is the arbitrary component include the same monomers as used in the first step. It is desirable to use the same polyfunctional monomer as that used in the first step, but a different monomer may be used.

A monomer mixture (C) which forms a hard polymer is polymerized as the third step in the presence of 100 parts by weight of the double-layer elastic copolymer (I). That is, in the third step 30 to 900 parts by weight of the monomer mixture (C) are polymerized in one or more steps, which mixture (C) comprises 80 to 100% by weight of at least one alkyl methacrylate having an alkyl group with 1 to 4 carbon atoms, 0 to 20% by weight of at least one alkyl acrylate having an alkyl group with 1 to 8 carbon atoms, 0 to 10% by weight of other vinyl or vinylidene monomer which are copolymerizable therewith and 0 to 3% by weight of a polyfunctional monomer having two or more acryloyloxy groups and/or methacryloyloxy groups in one molecule thereof.

In particular, in order to reduce the stress whitening of a resin composition, which is caused when an external force is exerted on a product made from the resin composition, a monomer mixture which is modified differently from the above-mentioned monomer mixture (C) is preferably used. Preferably, 1 to 100 parts by weight of a monomer mixture (C-1) comprising 80 to 99.9% by weight of at least one of the above-mentioned alkyl methacrylates, 0 to 20% by weight of at least one of the above-mentioned alkyl acrylates, 0 to 10% by weight of another vinyl or vinylidene monomer which is copolymerizable therewith, and 0.1 to 3% by weight of a polyfunctional monomer having two or more acryloyloxy groups and/or methacryloyloxy groups in one molecule thereof is polymerized first. Then 10 to 899 parts by weight of a monomer mixture (C-2) comprising 100 to 80% by weight of at least one alkyl methacrylate having an alkyl group with 1 to 4 carbon atoms, 0 to 20% by weight of at least one alkyl acrylate having an alkyl group with 1 to 8 carbon atoms, and 0 to 10% by weight of the vinyl or vinylidene monomer are polymerized on the first polymer wherein the total amount of (C-1) and (C-2) lies in a range from 30 to 900 parts by weight and the weight ratio of both monomer mixtures (C-2)/(C-1) lies in a range from 0.5 to 50.

Examples of alkyl methacrylates used in the third step include methyl methacrylate, ethyl methacrylate and propyl methacrylate, but methyl methacrylate is preferably used. If the content of the methacrylate in the monomer mixture (C) is less than 80%, the properties of the resin composition, such as transparency and heat resistance are degraded. Examples of the alkyl acrylates which are to be copolymerized with the methacrylate include methyl acrylate, ethyl acrylate and butyl acrylate. Examples of the other vinyl monomers usable as the copolymer component include styrene, acrylonitrile and methacrylic acid. If the content of the alkyl acrylates exceeds 20% by weight in the monomer mixture (C) the heat resistance and transparency of the final product are degraded, and if the content of the copolymerizable other vinyl monomer exceeds 10% by weight the transparency, heat resistance and water resistance are reduced.

It is required that the monomer or monomer mixture (C) is polymerized in an amount in the range from 30 to 900 parts by weight to 100 parts by weight of the elastic copolymer (I) having the double-layer structure comprising the first step and the second step polymers. If the amount is less than 30 parts by weight the impact resistance and gloss properties are degraded. On the other hand, if the amount exceeds 900 parts by weight the productivity of the elastomer decreases.

The polyfunctional monomer used in the third step may be selected from the same group as used in the first step.

A molecular weight control agent of a polymer such as a mercaptan may be used in the monomer or monomer mixture (C) as required to control the molecular weight. Examples of such agents include alkyl mercaptans, thioglycolic acid and esters thereof, $\beta$-mercaptopropionic acid and esters thereof, and aromatic mercaptans such as thiophenol and thiocresol.

The multi-layer acrylic copolymer (II) obtained through the above-mentioned series of polymerization processes is blended with a methacrylic resin (III) that is a copolymer of 80 to 100% by weight of methyl methacrylate and 0 to 20% by weight of other vinyl or vinylidene monomer such as acrylic ester having an alkyl group with 1 to 4 carbon atoms. The amount of the multi-layer acrylic copolymer (II) and methacrylic resin (III) in the blended composition is prescribed so that the above-mentioned double-layer elastic copolymer (I) is contained in the resultant methacrylic resin composition in the proportion of 1 to 70% by weight.

The multi-layer methacrylic resin composition of the present invention is preferably prepared by emulsion polymerization. An embodiment of preparation by emulsion polymerization will be described hereinafter.

After deionized water and an emulsifier, if required, is added into a reaction vessel, the monomer mixture (A) which is to constitute the semi-soft core of the first step copolymer is charged into the reaction vessel and polymerized, and then the monomer mixture (B) which produces the acrylic elastomer layer is charged and polymerized, and finally the monomer or moomer mixture (C) of the third step is charged and polymerized.

The polymerization temperature ranges from 30° to 120° C., more preferably from 50° to 100° C. The polymerization time depends on the type and amount of polymerization initiator and emulsifier and polymerization temperature, but usually a polymerization time of 0.5 to 7 hrs is used for each polymerization step.

Preferably the polymer to water ratio (monomer/water) ranges from 1/20 to 1/1. The polymerization initiator and emulsifier may be added in either water phase or monomer phase or in both phases.

Each monomer which is added in each step may be added in one stage or in several stages but addition in several stages is preferable in view of the heat of polymerization.

Emulsifiers that are used in the conventional emulsion polymerization are preferably used in the present invention without any limitation. Examples of such emulsifiers include salts of long-chain alkyl carboxylic acids, salts of sulfosuccinic acid alkylesters and salts of alkylbenzene sulfonic acids.

Any type of polymerization initiator may be used in the present invention without any limitation, and inorganic water soluble initiators such as persulfates and perborates may be used alone or in combination with sulfites and thiosulfates as the redox initiator. Redox initiators such as organic hydroperoxide-ferrous salts and organic hydroperoxide-sodium sulfoxylate can be used. Benzoyl peroxide and azobis-isobutyronitrile may also be used.

The polymer latex obtained by emulsion polymerization is coagulated and dried using conventional methods.

When the multi-layer methacrylic resin composition is blended and dispersed in another methacrylic resin, the molten blending method is the ideal method. Prior to the blending operation, additives other than resin compositions, such as stabilizers, lubricants, plasticizers, dyes and pigments and fillers, are added as desired, and those materials are mixed in a V-shaped blender or Henschel mixer. Then the mixture is melt-blended and kneaded at 150° to 300° C. using a mixing roll or screw-type extruder.

The thus-obtained resin composition is molded by an extrusion molding machine or by an injection molding machine to obtain molded articles with excellent transparency, weatherability, gloss and impact resistance.

The methacrylic resin composition of the present invention has excellent characteristics which are inherent in methacrylic resin such as transparency, gloss, modulus and surface hardness, in addition to excellent impact resistance.

The present invention will now be described in detail with reference to specific examples. The parts and percentages in the examples are parts by weight and percent by weight, respectively.

The properties of resin compositions in the examples are evaluated by the following methods.
(1) Izod impact test: ASTM-D-256
(2) Heat deformation resistance—the heat distortion temperature (HDT, °C.): ASTM-D-648
(3) Total luminous transmission—haze value: ASTM-D-1003 (measured at various temperatures)
(4) Folding whitening: an injection molded sheet with a thickness of 2 mm is folded at an angle of 90 degrees and the resulting stress whitening is evaluated visually as follows:
   : not whitened
   : whitened slightly
   : whitened considerably
   : whitened severely
(5) Bending test (breaking strength, elastic coefficient): ASTM-D-790-63
(6) Rockwell surface hardness: ASTM-D-785-65
(7) GLOSS: ASTM-D-673-44 (incident angle of 60 degrees)
(8) Weatherability: appearance is observed following accelerated exposure test using a Weather-O-Meter manufactured by Suga Test Instruments Co., Ltd.
Measuring Conditions: duration 1000 hours; temperature 60° C.; carbon arc; rain fall 12 minutes per hour.

EXAMPLE 1A AND COMPARATIVE EXAMPLES 1 and 2

(1) Preparation of the first step polymer:

Materials (1) described below were charged in a stainless steel reaction vessel with an internal volume of 50 liters, 802.4 g of a monomer mixture (A-1) shown in Table 1 was charged in one operation with stirring. Nitrogen gas was introduced so that the influence of oxygen was essentially eliminated. Thereafter the temperature was elevated to 70° C. The materials (2) described hereinunder were added and the polymerization was carried out for 60 min. Then 1203.6 g of a monomer mixture (A-2) shown in Table 1 was added continuously over 30 min. to polymerize, and the polymerization was continued further for 90 min after the end of the addition.

| Material (1) | |
|---|---|
| Deionized water | 25 g |
| Sodium N—lauroyl sarcocinate (referred as S-LN hereinafter) | 8 g |
| Boric acid | 100 g |
| Sodium carbonate | 10 g |
| Ferrous sulfate | 0.01 g |
| Di-sodium ethylenediamine tetraacetate (referred as EDTA-2Na) | 0.04 g |
| Materials (2) | |
| Deionzed water | 500 g |
| Sodium formaldehyde sulfoxylate (referred as Rongalite hereinafter) | 40 g |

TABLE 1

| | Monomer mixture (A-1) | | | | | | Monomer mixture (A-2) | |
| | Monomer and amount thereof g (%) | | | | | tBH amount (g) | Monomer and amounts thereof | t-BH amount (g) |
| | BA | ST | MMA | AMA | C₄-DA | | | |
| Example | 320 | 76 | 392 | — | 12 | 2.4 | Same to | 3.6 |

TABLE 1-continued

| | Monomer mixture (A-1) | | | | | | Monomer mixture (A-2) | |
|---|---|---|---|---|---|---|---|---|
| | Monomer and amount thereof g (%) | | | | | tBH amount (g) | Monomer and amounts thereof | t-BH amount (g) |
| | BA | ST | MMA | AMA | C4-DA | | | |
| 1A | (40) | (9.5) | (49) | | (1.5) | | the left | |
| Comparative example 1 | 632 (79) | 156 (19.5) | — (—) | 12 (1.5) | — (—) | 2.4 | Same to the left | 3.6 |
| Comparative example 2 | 28 (3.5) | — (—) | 760 (95) | 8 (1.0) | 4 (0.5) | 2.4 | Same to the left | 3.6 |

BA: Butyl acrylate
ST: Styrene
MMA: Methyl methacrylate
AMA: Allyl methacrylate
C4-DA: 1,4-butanediol dimethacrylate
t-BH: t-butyl hydroperoxide (2) Preparation of the second step polymer [I]:

A mixed aqueous solution comprising 500 g of deionized water, 50 g of S-LN and 20 g of Rongalite was added to the vessel containing 2 kg of solid, semisoft cross-linked copolymer obtained in the first step abovementioned. The temperature was elevated to 80° C., 8 kg of a monomer mixture (B) comprising 81% of butyl acrylate, 17.5% of styrene, 1.1% of triallyl isocyanurate (abbreviated as TAIC hereinafter) and 0.4% of 1,4-butanediol diacrylate (abbreviated as C4DA hereinafter), to which mixture (B) 32 g of tertiary butyl hydroperoxide (abbreviated as t-BH hereinafter) had been added, was polymerized with continuous addition thereof for 150 min. The polymerization was continued for 180 min after the completion of the addition. Thus a latex of an elastomeric polymer of the second step which contained the first step polymer in the interior of the particles thereof was obtained.

The particle size of the latex polymers when the second step was completed was measured by absorptiometry for Example 1A and comparative examples 1 and 2 to give a particle size of 0.28 μm for all examples.

(3) Preparation of the third step polymer [II]:

500 g of deionized water and 40 g of S-LN were charged into the vessel which held a latex containing 10 kg of a double-layer solid copolymer comprising the first step polymer and the second step polymer obtained in the process (2) mentioned above is contained. The internal temperature was maintained at 80° C. with stirring and a monomer mixture (C) described hereinafter was added continuously at a feeding rate of 40 parts/hr. The polymerization was continued further for one hour after the completion of the addition. Thus a multi-layer methacrylic graft copolymer (II) was obtained in a form of latex. The conversion of the monome mixture (C) exceeded 99.5%.

| Monomer mixture (C) | | |
|---|---|---|
| Methyl methacrylate (MMA) | 95% | |
| Methyl acrylate (MA) | 5% | 6 kg |
| n-octyl mercaptan (N—C8SH) | | 13.8 g |
| t-BH | | 9 g |

This latex was coagulated, washed and dried by the method described hereinunder to obtain a powder.

100 kg of 1.0% aqueous sulfuric acid solution was charged in a stainless steel vessel, the temperature was elevated to 70° C. with stirring. 40 kg of the latex previously prepared was added continuously over 15 min, and then the internal temperature was elevated to 90° C. and maintained at that temperature for 5 min. After cooling, the polymer was filtrated and separated and washed with deionized water to obtain a white creamy polymer, and the creamy polymer was dried at 70° C. for 24 hrs to obtain white powder polymer.

Next, the powder obtained through the process (3) mentioned above and methacrylic resin (Acrypet VH, Mitsubishi Rayon Co., Ltd.) was mixed in a Henschel mixer in the proportions shown in Table 3, meltkneaded using a screw type extruder at the cylinder temperature of 200° to 270° C. and die temperature of 260° C., and injection molded under the conditions shown below to obtain test specimens. The evaluation results for these specimens are shown in Table 3 and FIG. 1 (this figure shows the relationship between the gloss and Izod impact strength).

| Injection molding machine: | The Nippon Sekisho V-17-65 type screw automatic injection molding machine |
|---|---|
| Conditions for injection molding: | Cylinder temperature 250° C. injection pressure 700 kg/cm² |
| Size of specimens: | 110 mm × 110 mm × 2 mm (thickness) 70 mm × 12.5 mm × 6.2 mm (thickness) |

Regarding weatherability of Example No. 1 A-2, no change of appearance was observed. From the results shown in FIG. 1 it is obvious that a methacrylic resin composition made in accordance with the present invention is remarkably superior to those of the comparative examples in surface appearance and impact resistance and exhibits low haze and high transparency.

Figure 2:
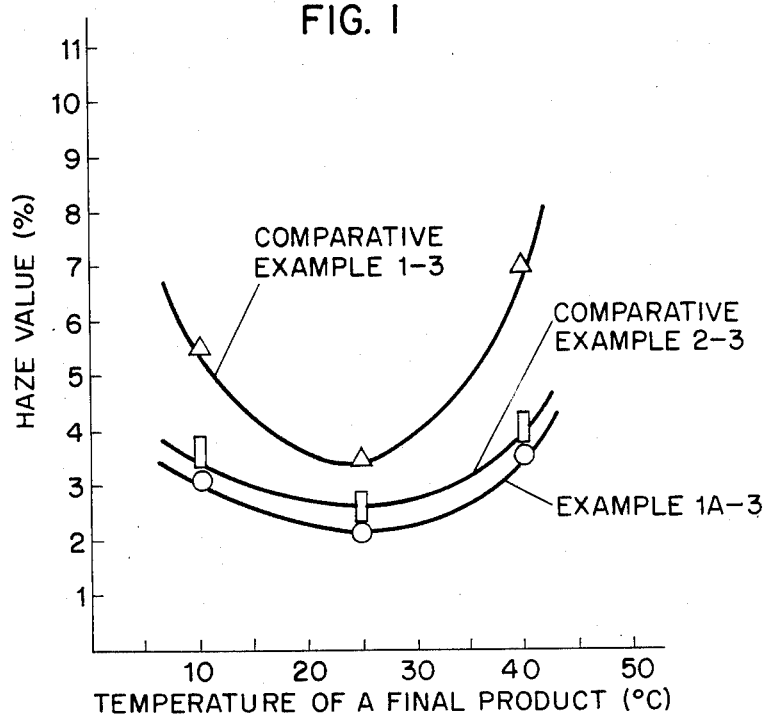
FIG. 2 is a graphical representation showing the dependence of the haze value of a product made from a methacrylic resin composition on the temperature of the product.

From FIG. 2 (showing the dependence of the haze value on the temperature) it is readily observed that the temperature dependence of the haze is very small.

EXAMPLE 1B

A methacrylic resin composition was obtained through the same process as used in Example 1A except that the chemical composition of the monomer mixture (C) was changed as described hereinunder and the blend ratio (%) of the multi-layer methacrylic copolymer (II) to the methacrylic resin (III) was changed to 48/52. Results are shown in Table 3.

The polymerization of the third step was carried out as follows: 32 g S-LN and 500 g of deionized water was charged into the above-mentioned vessel which held a latex 10.0 kg solids of the double-layer copolymer produced by the first step and the second step in Example 1A and the mixture was stirred. The monomer mixture (C) was divided into two parts, and the composition of the monomer mixture was changed to (C-1) and (C-2) as described below. First the monomer mixture (C-1) containing a polyfunctional monomer was added continuously over 45 min. Next the monomer mixture (C-2) containing no polyfunctional monomer was added continuously over 90 min into the reaction vessel, and the polymerization was continued for another 60 min to obtain a multi-layer methacrylic copolymer (II) in the form of a latex. The amounts and proportions of materials used in Example 1B are shown in Table 2.

Specimens of Examples 4 and 5 tend to decrease in impact strength in comparison with those of Examples 1 to 3 at the same content of the double-layer copolymer but they have higher impact strength than conventional formulations. (Comparative example 3).

TABLE 2

| | Amounts and ratio of monomer mixtures (C-1) and (C-2) | | | Monomer mixture (C-1) contg. polyfunctional monomer | | | | Monomer mixture (C-2) contg. no polyfunctional monomer | | | |
|---|---|---|---|---|---|---|---|---|---|---|---|
| | (C-1) (g) | (C-2) (g) | (C-2) (C-1) | MMA (%) | MA (%) | $C_6$-DA (%) | tBH (g) | MMA (%) | MA (%) | n-$C_8$SH (g) | tBH (g) |
| Example 1B | 1001.5 | 5020 | 5 | 95 | 4.6 | 0.4 | 1.5 | 95 | 5 | 12.5 | 7.5 | n-$C_8$SH: n-octyl mercaptan
$C_6$DA: 1,6-hexanediol diacrylate

TABLE 3

| | Blend ratio: copolymer (II)/ methacrylic resin (%) | (incident angle = 60 degree) (%) | Total luminous transmission (%) | Haze value (25° C.) (%) | Izod impact strength (kg · cm/cm²) | Heat distortion temp. (C.°) | Folding whitening | Rockwell hardness (R-scale) | Bending at break strength (kg/cm²) |
|---|---|---|---|---|---|---|---|---|---|
| Example1 A-1 | 16/84 | 98 | 92.3 | 1.4 | 3.1 | 97 | — | 126 | 1100 |
| Example1 A-2 | 32/68 | 96 | 92.1 | 1.7 | 4.3 | 91 | — | 112 | 1000 |
| Example1 A-3 | 45/52 | 95 | 92.1 | 1.9 | 6.4 | 86 | ○ | 104 | 900 |
| Example 1-B | 45/52 | 96 | 92.1 | 1.9 | 6.0 | 87 | ◉ | 105 | 910 |
| Comparative example 1-1 | 16/84 | 82 | 92.1 | 2.8 | 2.7 | 94 | — | 111 | 1080 |
| Comparative example 1-2 | 32/68 | 79 | 92.0 | 3.1 | 3.6 | 88 | — | 103 | 960 |
| Comparative example 1-3 | 48/52 | 76 | 92.0 | 3.5 | 5.1 | 84 | x | 92 | 840 |
| Comparative example 2-1 | 16/84 | 93 | 92.2 | 2.6 | 2.7 | 97 | — | 125 | 1100 |
| Comparative example 2-2 | 32/68 | 90 | 92.1 | 2.9 | 3.6 | 92 | — | 113 | 1000 |
| Comparative example 2-3 | 48/62 | 88 | 92.1 | 3.1 | 4.9 | 86 | △ | 105 | 900 |

EXAMPLES 2 TO 5 and COMPARATIVE EXAMPLE 3

Methacrylic resin compositions were obtained through the same process as used in Example 1A except that the type and proportion of monomer components which constituted the acrylate monomer mixture (B) were changed as shown in Table 4. The evaluation results of properties are shown in Table 5.

TABLE 4

| | Monomer and its amount (%) in monomer mixture (B) | | | | | | |
|---|---|---|---|---|---|---|---|
| | BA | ST | TAIC | ACM | $C_4$-DA | TAC | AMA |
| Example 2 | 81 | 17.5 | — | 1.2 | 0.3 | — | — |
| Example 3 | 81 | 17.5 | 0.6 | 0.5 | 0.4 | — | — |
| Example 4 | 81 | 17.5 | — | — | 0.3 | 1.2 | — |
| Example 5 | 81 | 17.5 | — | — | 0.3 | — | 1.2 |
| Comparative example 3 | 81 | 17.5 | — | — | 1.5 | — | — |

TABLE 5

| | Blend ratio: copolymer (II)/ methacrylic resin (%) | (incident angle = 60 degrees) (%) | Haze value (%) | Total luminous transmission (%) | Izod impact strength (kg · cm/cm²) | Heat distortion temp. (°C.) | Rockwell hardness (R-scale) |
|---|---|---|---|---|---|---|---|
| Example 2-1 | 16/84 | 97 | 1.3 | 92.3 | 3.0 | 96 | 126 |
| Example 2-2 | 32/68 | 96 | 1.7 | 92.2 | 4.1 | 92 | 111 |
| Example 2-3 | 48/52 | 94 | 1.8 | 92.1 | 6.0 | 87 | 106 |
| Example 3-1 | 16/84 | 97 | 1.4 | 92.2 | 3.2 | 96 | 125 |
| Example 3-2 | 32/68 | 96 | 1.6 | 92.1 | 4.0 | 91 | 112 |
| Example 3-3 | 48/52 | 94 | 1.9 | 92.1 | 6.5 | 88 | 104 |
| Example 4-1 | 16/84 | 93 | 1.7 | 92.1 | 2.3 | 96 | 124 |
| Example 4-2 | 32/68 | 90 | 2.0 | 92.0 | 3.4 | 91 | 110 |
| Example 4-3 | 48/52 | 88 | 2.8 | 92.0 | 4.1 | 88 | 104 |
| Example 5-1 | 16/84 | 89 | 2.3 | 92.1 | 2.6 | 95 | 124 |
| Example 5-2 | 32/65 | 85 | 2.8 | 92.0 | 3.3 | 90 | 109 |
| Example 5-3 | 48/52 | 84 | 3.1 | 92.0 | 3.9 | 86 | 103 |
| Comparative example 3-1 | 16/84 | 93 | 1.7 | 92.1 | 1.9 | 98 | 126 |
| Comparative example 3-2 | 32/68 | 90 | 2.3 | 92.0 | 2.0 | 93 | 112 |
| Comparative | 48/52 | 89 | 2.4 | 92.0 | 2.3 | 89 | 106 |

TABLE 5-continued

| Blend ratio: copolymer (II)/ methacrylic resin (%) | (incident angle = 60 degrees) (%) | Haze value (%) | Total luminous transmission (%) | Izod impact strength (kg·cm/cm²) | Heat distortion temp. (°C.) | Rockwell hardness (R-scale) |
|---|---|---|---|---|---|---|
| example 3-3 | | | | | | |

EXAMPLES 6 and 7 and COMPARATIVE EXAMPLE 4

Methacrylic resin compositions were obtained through the same process as used in Example 1B except that the chemical composition of the monomer mixture (C) was changed as shown in Table 6 and the blend ratio of the multi-layer methacrylic copolymer (II) to the methacrylic resin (III) was changed to 32/68. The results of evaluation are shown in Table 7.

TABLE 6

| | Amounts and ratio of monomer mixtures (C-1) and (C-2) | | | Monomer mixture (c-1) contg. polyfunctional monomer | | | | | Monomer mixture (C-2) contg. no polyfunctional monomer | | | |
|---|---|---|---|---|---|---|---|---|---|---|---|---|
| | (C-1) (g) | (C-2) (g) | (C-2)/ (C-1) | MMA (%) | MA (%) | $C_6$-DA (%) | TMP-3A (%) | tBH (g) | MMA (%) | MA (%) | n-$C_6$SH (g) | tBH (g) |
| Example 6 | 1001.5 | 5020 | 5 | 95 | 4.7 | 0.3 | — | 1.5 | 95 | 5 | 12.5 | 7.5 |
| Example 7 | 500.75 | 5522 | 11 | 95 | 4.9 | — | 0.1 | 0.75 | 95 | 5 | 13.75 | 8.25 |
| Comparative example 4 | 6009 | 0 | 0 | 90 | 5 | 5 | — | 9 | — | — | — | — |

TMP-3A: Trimethylolpropane triacrylate
n-$C_8$SH: n-octyl mercaptan
$C_6$DA: 1,6-hexanediol diacrylate

TABLE 7

| | (incident angle = 60 degrees) (%) | Haze value (%) | Total luminous transmission (%) | Izod impact strength (kg·cm/cm²) | Heat distortion temp. (°C.) | Rockwell hardness (R-scale) | Bending at break strength (kg/cm²) |
|---|---|---|---|---|---|---|---|
| Example 6 | 95 | 1.7 | 92.1 | 4.3 | 95 | 112 | 1050 |
| Example 7 | 96 | 1.6 | 92.1 | 4.1 | 93 | 111 | 1000 |
| Comparative example 4 | 90 | 2.9 | 92.0 | 1.5 | 93 | 112 | 450 |

We claim:

1. An impact resistant methacrylic resin composition comprising a multi-layer graft copolymer (II) and a methyl methacrylate polymer (III);
said multi-layer graft copolymer (II) being obtained by polymerizing 30 to 900 parts by weight of a monomer mixture (C) comprising 80 to 100% by weight of at least one alkyl methacrylate having an alkyl group with 1 to 4 carbon atoms, 0 to 20% by weight of at least one alkyl acrylate having an alkyl group with 1 to 8 carbon atoms, 0 to 10% by weight of at least one copolymerizable monomer selected from the group consisting of other vinyl monomers and vinylidene monomers and 0 to 3% by weight of at least one polyfunctional monomer having at least two functional groups selected from acryloyloxy groups and methacryloyloxy groups in one molecule thereof in at least one step in the presence of 100 parts by weight of a double-layer elastic copolymer (I);
said double-layer elastic copolymer (I) being prepared in two steps wherein in the first step 5 to 50 parts by weight of a monomer mixture (A) comprising 57 to 43% by weight of at least one alkyl methacrylate having an alkyl group with 1 to 4 carbon atoms, 7 to 12% by weight of styrene or a styrene derivative, 35 to 45% by weight of at least one alkyl acrylate having an alkyl group with 1 to 8 carbon atoms, and 0.1 to 10% by weight of at least one polyfunctional monomer having at least two functional groups selected from the group consisting of acryloyloxy groups and methacryloyloxy groups in one molecule thereof is polymerized, and in the second step 95 to 50 parts by weight of a monomer mixture (B) comprising 69 to 89% by weight of at least one alkyl acrylate having an alkyl group with 1 to 8 caron atoms, 10 to 30% by weight of styrene or a styrene derivative, 0.1 to 5% by weight of a graft-linking monomer and 0 to 5% by weight of at least one polyfunctional monomer having at least two functional groups selected from the group consisting of acryloyloxy groups and methacryloyloxy groups in one molecule thereof is polymerized in the presence of the copolymer obtained through said first step; and
said methyl methacrylate polyer (III) comprising 80 to 100% by weight of methyl methacrylate units and 0 to 20% by weight of units of at least one copolymerizable monomer selected from the group consisting of other vinyl monomers and vinylidene monomers.

2. A composition as defined in claim 1, wherein the graft-linking monomer is selected from the group consisting of triallyl isocyanurate and allyl cinnamate.

3. A composition as defined in claim 1, wherein said polyfunctional monomer having at least two functional groups is an acrylic or methacrylic ester of polyhydric alcohol having 3 to 6 carbon atoms.

4. A composition as defined in claim 1, wherein said polyfunctional monomer having at least two functional groups is at least one ester selected from the group consisting of 6-hexanediol diacrylate, trimethylolpropane triacrylate and 1,4-butanediol diacrylate.

5. An impact resistant methacrylic resin composition comprising a multi-layer graft copolymer (II) and a methyl methacrylate polymer (III);

said multi-layer graft copolymer (II) being obtained by a sequential four-step polymerization procedure wherein in the first step, 5 to 50 parts by weight of a monomer mixture (A) comprising 57 to 43% by weight of at least one alkyl methacrylate having an alkyl group with 1 to 4 carbon atoms, 7 to 12% by weight of styrene or its derivative, 35 to 45% by weight of at least one alkyl acrylate having an alkyl group with 1 to 8 carbon atoms, and 0.1 to 10% by weight of at least one polyfunctional monomer having at least two functional groups selected from the group consisting of acryloyloxy groups and methacryloyloxy groups in one molecule thereof is polymerized.

in the second step 95 to 50 parts by weight of a monomer mixture (B) comprising 69 to 89% by weight of at least one alkyl acrylate having an alkyl group with 1 to 8 carbon atoms, 10 to 30% by weight of styrene or its derivative, 0.1 to 5% by weight of a graft-linking monomer and 0 to 5% by weight of a polyfunctional monomer having at least two functional groups selected from the group consisting of acryloyloxy groups and methacryloyloxy groups in one molecule thereof is polymerized in the presence of the polymer obtained in the first step, thereby to obtain a double-layer elastic copolymer (I);

in the third step, 1 to 100 parts by weight of a monomer mixture (C-1) comprising 80 to 99.9% by weight of at least one alkyl methacrylate having an alkyl group with 1 to 4 carbon atoms, 0 to 20% by weight of at least one alkyl acrylate having an alkyl group with 1 to 8 carbon atoms, 0 to 10% by weight of at least one monomer selected from the group consisting of other vinyl monomers and vinylidene monomers and 0.1 to 3% by weight of at least one polyfunctional monomer having at least two functional groups selected from the groups consisting of acryloyloxy groups and methacryloyloxy groups in one molecule thereof is polymerized in the presence of 100 parts by weight of said double-layer elastic copolymer (I);

in the fourth step, 10 to 899 parts by weight of a monomer mixture (C-2) comprising 100 to 80% by weight of at least one alkyl methacrylate having an alkyl group with 1 to 4 carbon atoms, 0 to 20% by weight of at least one alkyl acrylate having an alkyl group with 1 to 8 carbon atoms and 0 to 10% by weight of at least one monomer selected from the group consisting of other vinyl monomers and vinylidene monomers is polymerized in the presence of the copolymer obtained in the third step, wherein the total amount of (C-1) and (C-2) ranges from 30 to 900 parts by weight and the weight ratio of both monomer mixtures (C-2)/(C-1) ranges from 0.5 to 50; and said methyl methacrylate polymer (III) comprising 80 to 100% by weight of methyl methacrylate units and 0 to 20% by weight of units of at least one copolymerizable monomer selected from the group consisting of other vinyl monomers and vinylidene monomers.

6. A composition as defined in claim 5, wherein the graft-linking monomer is selected from the group consisting of triallyl isocyanurate and allyl cinnamate.

7. A composition as defined in claim 5, wherein the polyfunctional monomer having at least two functional groups used in the first step, the second step and the third step is acrylic or methacrylic ester of polyhydric alcohols having 3 to 6 carbon atoms.

8. A composition as defined in claim 5, wherein the polyfunctional monomer having at least two functional groups in one molecule thereof used in the first step, the second step and the third step is at least one ester selected from the group consisting of 6-hexanediol diacrylate, trimethylolpropane triacrylate and 1,4-butanediol diacrylate.

* * * * *

UNITED STATES PATENT AND TRADEMARK OFFICE
CERTIFICATE OF CORRECTION

PATENT NO. : 4,730,023

DATED : March 8, 1988

INVENTOR(S) : Sato et al.

It is certified that error appears in the above-identified patent and that said Letters Patent is hereby corrected as shown below:

Column 6, line 30: The expression "β-methyl" should read --α-methyl--.

Column 7, line 33: The word "trially" should read --triallyl--.

Column 9, line 7: The word "moomer" should read --monomer--.

Column 11, line 50: The word "monome" should read --monomer--.

Column 15, TABLE 6, line 4 of heading, 2nd item from right: The expression "n-$C_6$SH" should read --n-$C_8$SH--.

Column 16, line 51: The word "polyer" should read --polymer--.

Signed and Sealed this

Twentieth Day of September, 1988

Attest:

DONALD J. QUIGG

Attesting Officer

Commissioner of Patents and Trademarks